Figure 1:
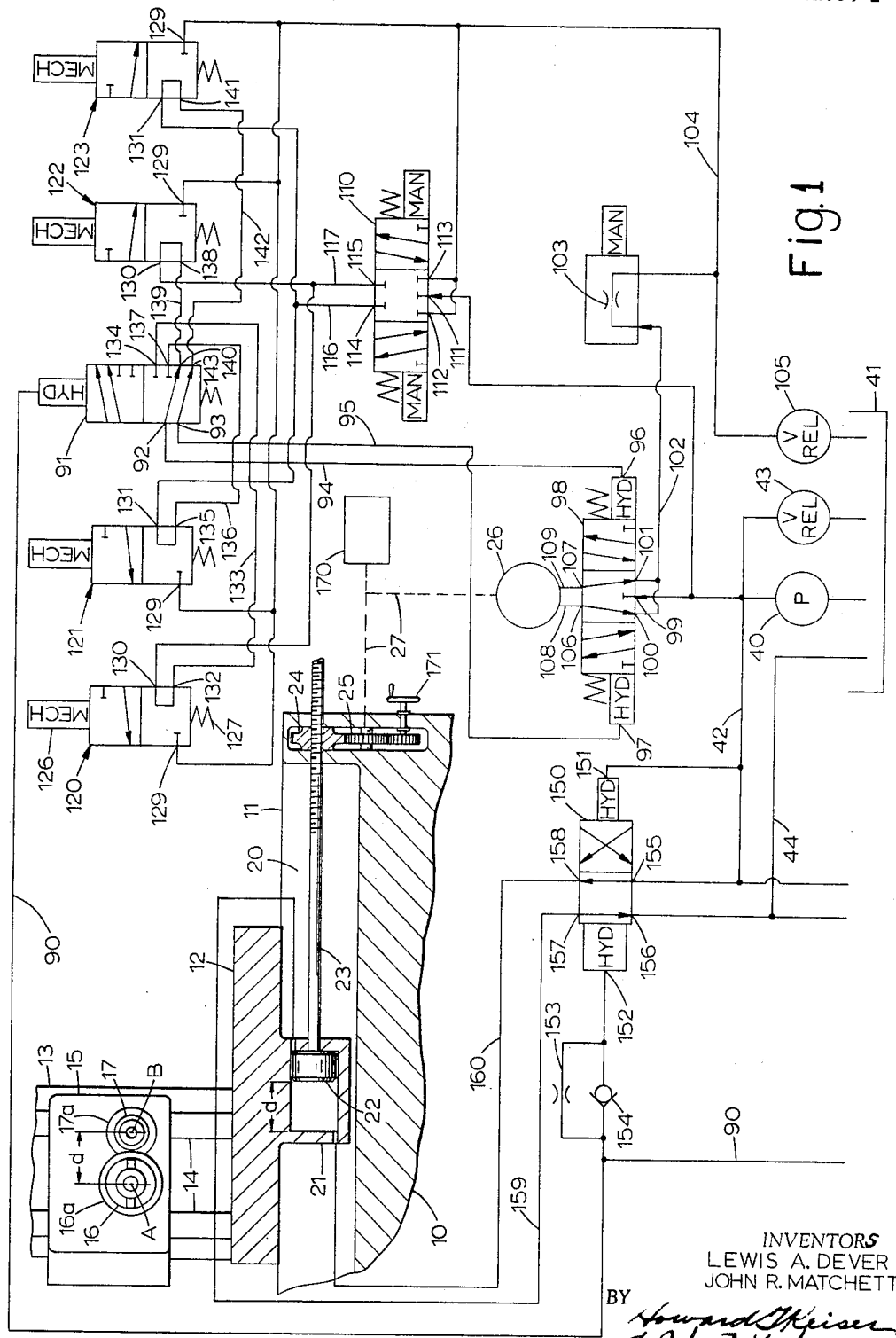

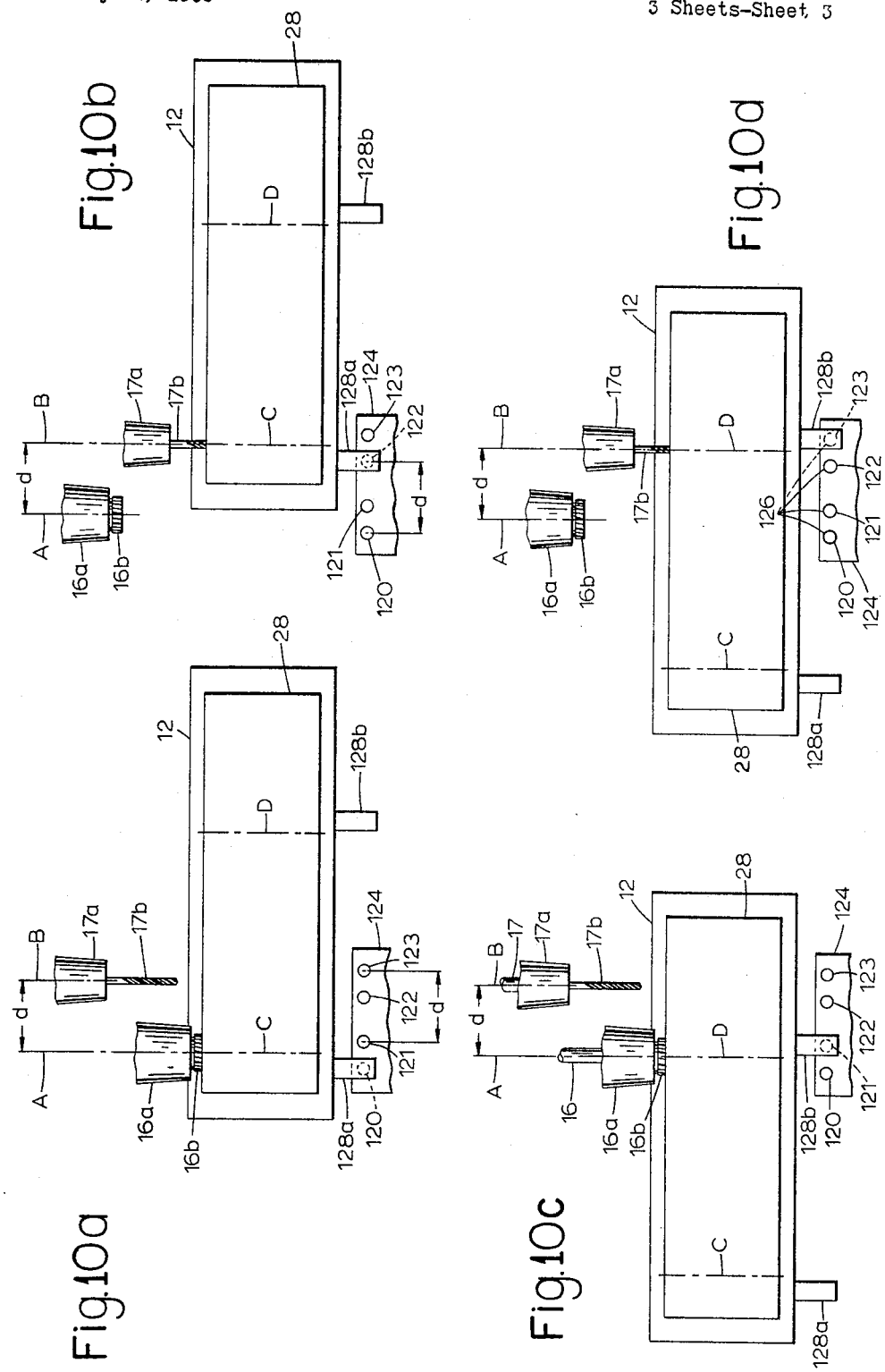

United States Patent Office 3,280,449
Patented Oct. 25, 1966

3,280,449
CONTROL MECHANISM FOR MULTI-SPINDLE MACHINE
Lewis A. Dever, Cincinnati, Ohio, and John R. Matchett, South Fort Mitchell, Ky., assignors to The Cincinnati Milling Machine Co., Cincinnati, Ohio, a corporation of Ohio
Filed July 16, 1965, Ser. No. 472,603
12 Claims. (Cl. 29—26)

The present invention relates to a multi-spindle machine tool and control mechanism therefor.

In a conventional milling machine, a tool is carried by a spindle for operation on a workpiece which is supported on a table or slide. In order to operate on the workpiece, the table and the spindle must be relatively positioned with accuracy, either by moving the table with respect to the spindle or by moving the spindle with respect to the table. Sometimes a readout unit is connected to the movable member as, for example, the table to provide a visible set of digits indicating the instantaneous position of the table with respect to the spindle.

If a second spindle is provided to carry a second tool for an alternate operation on the workpiece, the table and the particular spindle which is to be used for a particular operation must be relatively positioned before the operation is begun. If a subsequent operation is to be performed on the workpiece with the tool carried by the other spindle, the table and that other spindle must be relatively positioned before the subsequent operation is begun, even if the operation is to be performed at the same point on the workpiece as the previous operation. In other words, the relative positioning between the table and the spindle will depend on which spindle is to be used, and if the spindle is changed, the relative positioning between the table and the spindle must be changed. In conventional machines, each positioning move of the table is either accomplished by coded input data (if the machine is controlled by a numeriacl control input tape), or is carefully made by the machine operator. The use of coded input data for moving the table every time a different spindle is used complicates the preparation of the coded input tape. On the other hand, manual positioning of the table by the operator for each change of spindle takes time and effort which lengthens the machining cycle on a workpiece and leads to operator errors.

In the present invention first and second tool carrying spindles are provided for alternate use on a workpiece secured to a work table. On each change of spindle, relative shifting between the table and spindles is provided by means including a fixed stroke motor to bring the table into the same relationship with, say, the second spindle as it had with the first spindle, regardless of what that relationship was. In other words, if, for example, a hole was drilled at a certain point on a workpiece secured to the table with a drill in the first spindle, the table can be shifted quickly to bring the hole to the second spindle for a subsequent operation at that point by another tool in the second spindle. The fixed stroke motor shifts the table a distance equal to the exact distance between the spindles. In tape controlled machine operations, the fixed stroke motor eliminates the need to code each shift into the tape; in manually controlled machine operations, the fixed stroke motor saves the time spent in slow manual repositioning and eliminates the possibility of human error.

Preferably, the table is positioned by means including a drive member. The fixed stroke motor is connected between the drive member and the table for operation automatically when a different spindle is selected for operation. In one position of the fixed stroke motor, regardless of the position of the drive member, the table is in some predetermined relationship to a first spindle. In the other position of the fixed stroke motor (and the same position of the drive member), the table is in the same predetermined relation to the second spindle as it was, in the other position of the fixed stroke motor, to the first spindle. The readout unit, which is connected to the drive member, is not affected by the shifting of the table due to operation of the fixed stroke motor, and therefore the readout unit gives the same reading to indicate the relationship of the table (and workpiece) to the spindle (and tool), regardless of which spindle and tool is effective at the moment.

There is also provided a control member for each spindle. The control members for the two spindles are positioned adjacent the table for operation by the movement of the table. The control members, which are effective one at a time to control, or stop, the table are spaced apart a distance equal to the distance between the spindles so that one control member bears the same relationship to one spindle as the other control member bears to the other spindle. Only the control member corresponding to the spindle currently in use is effective in controlling the table. Preferably, two sets of control members are used, each set comprising two control members and the control members of one set spaced the same distance as the spacing between the spindles from the corresponding control members of the other set. The control members may, for example, be in the form of valves, the valve plungers of which are depressed by dogs on the table. The control members of one set stop the table at two different points relative to one spindle; the control members of the other set stop the table at two different points relative to the other spindle. The stopping points of the table, when one spindle is in use, bear the same relation to that one spindle as the stopping points of the table, when the other spindle is in use, bear to that other spindle. When one spindle is in use, only the control members corresponding to that one spindle are rendered effective; when the other spindle is in use, only the control members corresponding to that other spindle are rendered effective.

It is therefore one object of the present invention to provide an improved multi-spindle machine and control therefor. It is another object of the present invention to provide quick relative shifting between the table and the spindles when a change from one spindle to another is made. It is yet another object of the present invention automatically to effect relative shifting between the table and spindles when a change of spindle is made to maintain the same relationship between the effective spindle and the work on the table. It is another object of the present invention to provide table control members for alternate use depending on which spindle is to be used. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figures 2, 3:
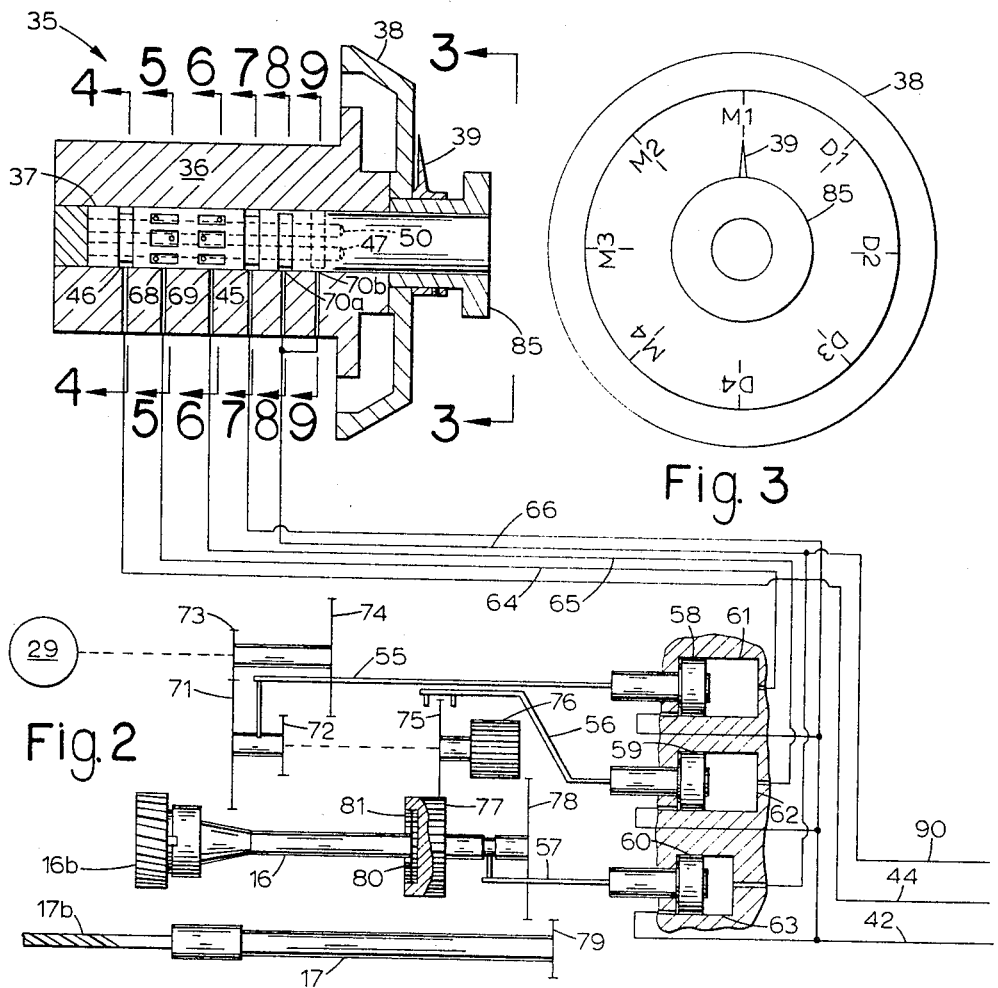

In the drawings:

FIGS. 1 and 2 are schematic diagrams of the machine and control system of the present invention;

FIGS. 3, 4, 5, 6, 7, 8, and 9 are views taken on the lines 3—3, 4—4, 5—5, 6—6, 7—7, 8—8, and 9—9 of FIG. 2; and FIGS. 10a, 10b, 10c, and 10d are schematic plan views of portions of the machine of FIGS. 1 and 2 showing the two spindles alternately operating on two different points on a workpiece.

There is shown in FIG. 1, a milling machine having a base 10 with ways 11 thereon. A table 12 is supported on ways 11 for longitudinal movement thereon (to the left or to the right as viewed in FIG. 1). An upstanding column 13, which has vertical ways 14 thereon, is mounted on the base. A spindle carrier 15 is mounted on the ways 14 for vertical movement thereon. A pair 16, 17 of parallel spindles are mounted in quills 16a, 17a in the spindle carrier and lie on axes A and B, respectively, which are spaced apart a distance d.

The base 10 has a well 20, and a cylinder 21 fixed with respect to the table, is received in the well. A piston 22, which is connected to connecting rod 23, is slidably received in the cylinder 21. The cylinder 21 and piston 22 define a shift motor having a fixed stroke equal to the distance d. The rod 23, which defines a drive member, is threadedly received in a gear 24 journaled in the base. The gear 24 is continuously engaged with a gear 25 which is connected to motor 26 for rotation thereby as indicated by dotted line 27.

One of the spindles 16 is of heavier construction than the other spindle 17, and is designed to operate at slower speeds than spindle 17. Normally, the heavier, slower spindle 16 receives a milling tool 16b (FIG. 2) for an operation on a workpiece 28 (FIGS. 10a, 10b, 10c, 10d) mounted on the table, and the lighter, faster spindle 17 receives a drilling tool 17b (FIG. 2) for an operation, alternately, on the same workpiece. In other words, the spindles, which usually take different types of tools, operate alternately on the workpiece secured to the table, with only one spindle (and the tool therein) effective at one time. Each quill is advanced and retracted by conventional means (not shown) to advance and retract the spindle relative to the workpiece (to feed the tool into the workpiece and retract the tool from the workpiece) independent of the other spindle. Rotation of the effective spindle (16 or 17) is effected by operation of motor 29.

Figures 4, 5, 6:
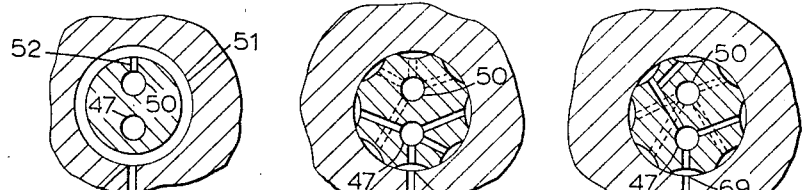
Figures 7, 8, 9:
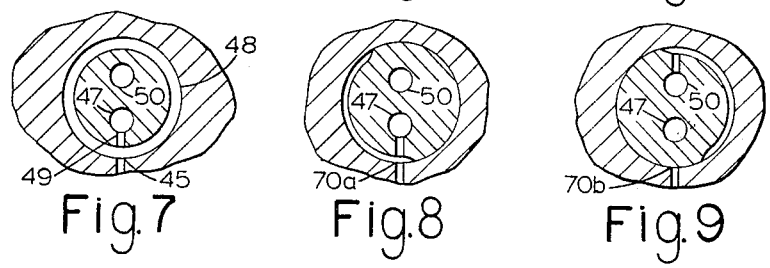

The motor 29 is operated through a selector valve 35 (FIG. 2) which has a stationary body 36 and a rotatable core 37. The body has a plate 38 connected thereto and the core has a pointer 39 secured thereon. A pump 40 (FIG. 1) takes fluid from a sump 41 and delivers it under pressure to a pressure line 42. A safety relief valve 43 is connected to the pressure line 42 and discharges to the sump to prevent excessive pressure in line 42. A return line 44 discharges to sump 41. Pressure line 42 is connected to port 45 of selector valve 35 and return line 44 is connected to port 46 of that valve. Port 45 is connected to longitudinal passage 47 in core 37 through annular passage 48 and radial passage 49 as shown in FIG. 7. Port 46 is connected to longitudinal passage 50 in core 37 through annular passage 51 and radial passage 52 as shown in FIG. 4. Thus, at all times, passage 47 is connected to pressure line 42 and passage 50 is connected to return line 44.

Three gear shifters 55, 56, and 57 are connected, respectively, to pistons 58, 59, and 60 which are received, respectively, in cylinders 61, 62, and 63. Lines 64, 65, and 66 are each connected to one end of the cylinders 61, 62, and 63, respectively, and pressure line 42 is connected to the opposite end of all of the cylinders 61, 62, 63. The areas of the pistons exposed to the end of the cylinders connected to line 42 are less than the areas of the pistons exposed to the end of the cylinders connected to lines 64, 65, 66. Consequently, when lines 64, 65, or 66 are in communication with pressure line 42, pistons 58, 59, or 60, respectively, shift to the left (as viewed in FIG. 2). When lines 64, 65, or 66 are in communication with return line 44, pistons 58, 59 or 60 shift to the right. Line 64 is connected to selector valve port 68 (FIG. 5); line 65 is connected to selector valve port 69 (FIG. 6); and line 66 is connected to selector valve port 70a (FIG. 8) and 70b (FIG. 9).

As piston 58 shifts to the right or left, gear shifter 55, which is connected to piston 58, shifts the gear unit consisting of gears 71, 72 to the right or left. The axially fixed gear unit consisting of gears 73, 74 is connected to motor 29. When the gear shifter 55 is in the position shown, gear 71 is engaged with gear 73; when the gear shifter 55 is shifted to the right, gear 72 is engaged with gear 74. As piston 59 shifts to the right or left, gear shifter 56, which is connected to piston 59, shifts the gear unit consisting of gears 75, 76 to the right or left. When the gear shifter 56 is in the position shown, gear 75 is engaged with gear 77 (regardless of the position of piston 60 and gear shifter 57); when the gear shifter 56 is shifted to the right, gear 76 is engaged with gear 78 (regardless of the position of piston 60 and gear shifter 57). As piston 60 shifts to the right or left, gear shifter 57, which is connected to piston 60, shifts the gear unit consisting of gears 77 and 78 to the right or left. When the gear shifter 57 is in the position shown, the internal threads 81 of gear 77 are engaged with the axially fixed gear 80 on spindle 16; when the gear shifter 57 is shifted to the right, the gear 78 is engaged with the gear 79 on spindle 17. Thus, in any position of the gear shifters 55, 56, and 57, one or the other of the spindles 16, 17 is running at a speed determined by the position of the gear shifters and the gears controlled thereby.

It will be noted that line 64 is connected, through port 68 and one of the core passages shown in FIG. 5, to either pressure passage 47 or exhaust passage 50, depending on the angular position of the selector core 37, which is rotated by knob 85. Similarly, line 65 is connected, through port 69 and one of the core passages shown in FIG. 6, to either pressure passage 47 or exhaust passage 50, depending on the angular position of the selector core 37. Line 66 is connected, either through port 70a and the core passages shown in FIG. 8, to core pressure passage 47, or through port 70b and the core passages shown in FIG. 9 to core passage 50, depending on the angular position of the selector core 37.

The heavier spindle 16, which may be described as a milling spindle, will be driven by motor 29 when piston 60 is in the position shown in FIG. 3, and the lighter spindle 17, which may be described as a drilling spindle, will be idle. Piston 60 will be in the position shown whenever line 66, which is connected to ports 70a and 70b, is in communication with core pressure passage 47. As indicated by FIGS. 3, and 8, line 66 will be in communication with pressure passage 47 when the pointer 39, which is connected for rotation with core 37, is in the milling positions indicated as M1, M2, M3, and M4. When the piston 60 is shifted to the right, the drilling spindle 17 will be driven by motor 29 and the milling spindle 16 will be idle. The piston 60 will be to the right when line 66 is in communication with core exhaust passage 50. As can be seen from FIGS. 3 and 9, line 66 will be in communication with exhaust passage 50 when the pointer 39 is in the drilling positions indicated as D1, D2, D3, and D4.

A line 90 is connected to line 66. Consequently, line 90 is in communication with pressure when the core 37 is in any of the milling positions and is in communication with exhaust when core 37 is in any of the drilling positions. Line 90 is connected to valve 91 (FIG. 1). Valve 91 has two ports 92, 93 which are connected to lines 94, 95, respectively. The lines 94, 95, lead to end ports 96, 97 of a spring centered direction valve 98. Direction valve 98 has a pressure port 99 connected to pressure line 42, and has two exhaust ports 100, 101 connected to a return line 102. Return line 102 is connected through restriction 103 to return line 104. Line 104 is connected to a relief valve 105 which dumps fluid to sump 41 at a low pressure of, say, 15 pounds per square inch to maintain a slight back pressure in line 104. Direction valve 98 has two motor ports 106, 107 connected, respectively, to motor lines 108, 109 which lead to opposite sides of rotary hydraulic motor 26.

A pilot valve 110 has a pressure port 111 which is connected to pressure line 42. Valve 110 has two exhaust ports, 112, 113 which are connected to line 104. The valve 110 also has two ports 114, 115 which are connected to lines 116, 117, respectively.

As shown in FIGS. 1, 10a, 10b, 10c, and 10d, four blocking valves 120, 121, 122, and 123 are mounted in a panel 124 adjacent the table 12. Each of the valves 120, 121, 122, 123 has a plunger 126 which is actuated to operate the valve against the bias of spring 127 by one of the dogs 128a and 128b on the table. Each of the valves 120, 121, 122, and 123 has a port 129 connected to return line 104. Valves 120, 121 define a set of control members effective to stop the table when the milling spindle is effective, and valves 122, 123 define a set of control members effective to stop the table when the drilling spindle is effective. As shown in FIGS. 10a and 10b, the control members of one set are spaced the distance d, which is the spacing between the spindles, from the corresponding control members of the other set.

Valves 120 and 122 each has a port 130 connected to line 117; valves 121 and 123 each has a port 131 connected to line 116. Valve 120 has a port 132 connected by line 133 to port 134 of valve 91; valve 121 has a port 135 connected by line 136 to port 137 of valve 91; valve 122 has a port 138 connected by line 139 to port 140 of valve 91; and valve 123 has a port 141 connected by line 142 to port 143 of valve 91.

A valve 150 has one end port 151 connected to pressure line 42 and has the opposite end port 152 connected through restriction 153 to line 90. A check valve 154 is connected around restriction 153. Port 155 of valve 150 is connected to pressure line 42; port 156 of valve 150 is connected to return line 44. Ports 157 and 158 of valve 150 are connected, respectively, to lines 159, 160 which lead to opposite ends of cylinder 21.

In order to understand the operation of the machine, assume a face milling operation and a drilling operation are to be performed on the workpiece 28 on an axis C three inches from the left end of the worpiece. The two operations are to be repeated on an axis D twenty inches from the left end of the workpiece. The readout unit 170, which is mechanically connected between motor 26 and drive gear 25 for operation as the motor 26 runs to move the table 12, is set to read zero when the left end of the workpiece 28 is aligned with axis A and the table 12 and cylinder 21 are in the mill position (that is, the left hand position) with respect to the piston 22 as shown in FIG. 1. It should be noted that the readout unit will also read zero when the left end of the workpiece 28 is aligned with the axis B and the table 12 and cylinder 21 are in the drill position (that is, the right hand position) with respect to the piston 22. In other words, the table 12 can shift relative to the drive member, or threaded connecting rod, 23, without changing the reading in the readout unit 170 because the readout unit is connected into the drive train between the power motor 26 and the shift motor defined by cylinder 21 and piston 22. With this construction, the readout unit will give a reading with respect to the mill spindle if the table is in a mill position relative to the drive member 23, and the readout unit will give a reading with respect to the drill spindle if the table is in a drill position relative to the drive member 23.

Assume, initially, the table is in a central position with respect to the spindles (the readout unit has a reading of, say, 10 inches). The operator will rotate the selector valve core 37 to the desired milling speed (say, for example, M1). This will put pressure into line 90 and shift the valve plunger of valve 91 to connect ports 92, 93, respectively, with ports 134, 137. The ports 134 and 137 are connected, respectively, to lines 133, 136 which lead to control valves 120, 121. Consequently, it is these control members 120, 121 which are effective when pressure is in line 90. With pressure in line 90, the valve plunger (which has a larger area exposed to port 152 than exposed to port 151) of valve 150 is in the position shown. Pressure from line 42 is transmitted through line 160 to position the table in the mill position (as shown) relative to piston 22 and drive member 23. The operator then shifts the valve plunger of valve 110 to the left, connecting pressure line 42 to line 117 and connecting line 116 to return line 104.

Pressure is communicated from line 117 through valve 120 to line 133. At the same time, line 136 is connected to line 116 and return line 104 through valve 121 and valve 110. Thus, at this time, pressure is transmitted through valve 91 to line 94, and line 95 is connected, through valve 91, line 136, line 116, and valve 110 to return line 104. The dog 128a on the table 12 has been set to operate plunger 126 of valve 120 when the axis C on the workpiece is aligned with axis A, as shown in FIG. 10a. At that time, the valve member of valve 120 is shifted to block port 130 and connect port 132 to port 129. This relieves the pressure in line 133 and line 94, permitting valve 98 to return to a centered position, and stopping motor 26. The readout unit 170 will read approximately three inches at this time. Precise positioning to make the readout unit read exactly three inches is effected by handwheel 171.

After axes C and A are aligned by handwheel 171, the quill 16a which supports the milling spindle 16 is advanced (by conventional means, not shown) for a face milling operation (as shown in FIG. 10a). After the face milling operation, the spindle 16 is retracted. At that time, the operator turns selector valve core 37 to a desired drilling speed (say D2) for the drilling operation on axis C. This connects line 66 and 90 to return line 44 (through core passage 50) which causes valve 150 to shift, reversing the pressure and exhaust connections to cylinder 21. Thus table 12 shifts the distance d to align axis C with spindle axis B, as shown in FIG. 10b. This shift does not change the readout unit reading which remains at 3.0 inches. As pressure in line 90 is relieved, the valve plunger of valve 91 is shifted by spring 127, connecting lines 94 and 95 to lines 139, 142 respectively which lead to control valves 122, 123. Consequently, it is these control members 122, 123 which are effective when pressure is relieved from line 90.

The quill 17a which carries spindle 17 advances to advance the drill (by conventional means, not shown) for a drilling operation on axis C. After the drilling operation, the drill is retracted. At this time the operator rotates the selector valve core 37 back to the M1 position which reinstates pressure in line 90 and repositions the valve member of valve 91 to reconnect lines 133, 136 to lines 94, 95, respectively. This renders control members 120, 121 effective. Pressure in line 91 also shifts the valve plunger of valve 150, shifting the table 12 to the mill position relative to the drive member 23.

The operator shifts the valve plunger of valve 110 to the right, putting pressure into line 116 and connecting line 117 to return line 104. Thus, at this time, line 95 is in communication through line 136, valve 121, line 116, and valve 110 to pressure line 42. Line 94 is connected to return line 104 through valve 91, line 133, valve 120, line 117, and valve 110. This shifts valve plunger of valve 98 to the right to move the table 12 to the right. When the readout unit reads approximately 20.0 inches, the dog 128b on the table will depress the valve plunger of valve 121, disconnecting line 136 from pressure to stop the motor 26. Final positioning of the table is accomplished with handwheel 171. Again, the milling spindle is advanced to operate on the workpiece on axis D, and retracted. The operator then dials in the desired drill speed D2 which again relieves pressure from line 90. The valve plungers of vlave 91 and valve 150 shift and table 12 again shifts to the drill position relative to drive member 23. Thereafter, the drill is fed into the work and then retracted.

Thus, the two spindle machine is provided with a table which is automatically shifted relative to a drive member the same amount as the distance between the spindles whenever there is a change of spindle. Two sets of control valves are provided, one set effective when the table is shifted for an operation by a tool in one of the spindles and the other set effective when the table is shifted for an operation by a tool in the other spindle. The valve plungers of one set of valves are spaced a distance $d$ from the corresponding valve plungers of the other set of valves equal to the distance between the spindles. In other words, the table is shiftable relative to a drive member when a change from one spindle to the other is made. The table, in a first position, bears the same relationship to a first spindle and a first set of dog operated valves as the table, when in a second position, bears to a second spindle and a second set of dog operated valves.

What is claimed is:

1. In a machine tool:
   (a) a pair of spindles spaced apart a predetermined distance,
   (b) a table, and
   (c) means to effect relative shifting between the table and the spindles including a motor having a fixed stroke equal to said predetermined distance.

2. In a machine tool:
   (a) a spindle carrier having a pair of spindles spaced apart a predetermined distance,
   (b) a table,
   (c) a first motor to effect relative movement between the table and the spindle carrier, and
   (d) a second motor to effect relative shifting between the table and the spindle carrier said predetermined distance independently of said first motor.

3. In a machine tool having a pair of spindles spaced apart a predetermined distance:
   (a) a drive member,
   (b) means to effect controlled movement of said drive member,
   (c) a table mounted for movement past the spindles, and
   (d) a fixed stroke motor connected between the table and the drive member operable to shift the table said predetermined distance relative to the drive member.

4. In a machine tool having a pair of spindles each having a tool therein and spaced apart a predetermined distance:
   (a) a table for supporting a workpiece,
   (b) means to select one or the other of the spindles for an operation on the workpiece, and
   (c) means to effect relative movement between the table and the spindles including a fixed stroke motor to effect relative shifting said predetermined distance in response to a change of spindles.

5. In a machine tool having a pair of spindles each having a tool therein and spaced apart a predetermined distance:
   (a) a drive member,
   (b) a drive motor to move said drive member,
   (c) means to control said drive motor,
   (d) a table to support a workpiece, said table mounted for movement past the spindles,
   (e) a fixed stroke motor connected between the table and the drive member operable to shift the table said predetermined distance relative to the drive member when the fixed stroke motor is energized,
   (f) means to actuate one or the other of said spindles to perform an operation on the workpiece, and
   (g) means responsive to a change of spindles to energize said fixed stroke motor.

6. In a machine tool having a pair of spindles each having a tool therein and spaced apart a predetermined distance,
   (a) a drive member,
   (b) a drive motor to move said drive member,
   (c) means to control said drive motor,
   (d) a table to support a workpiece, said table mounted for movement past the spindles,
   (e) a piston and cylinder connected between the table and the drive member to define a fixed stroke motor for shifting the table said predetermined distance relative to the drive member when the fixed stroke motor is energized,
   (f) means to select one or the other spindle for operation by the tool therein on the workpiece,
   (g) means to actuate the selected spindle, and
   (h) means responsive to a change of spindles to energize said fixed stroke motor.

7. In a machine tool:
   (a) a pair of spindles spaced apart a predetermined distance,
   (b) a table to support a workpiece, said table mounted for movement past the spindles,
   (c) means to render one of said spindles effective at a time to operate on said workpiece, and
   (d) a pair of control members positioned adjacent the table for operation in response to movement of the table, said control members spaced apart said predetermined distance and each effective when one of said spindles is rendered effective to control movement of the table.

8. In a machine tool having a pair of spindles spaced apart a predetermined distance:
   (a) a table to support a workpiece, said table mounted for movement past the spindles,
   (b) two sets of control members positioned adjacent the table for operation in response to movement of the table, said sets of control members spaced apart said predetermined distance, and
   (c) means to render one spindle at a time effective for operation on the workpiece and to render one set of control members at a time effective for controlling movement of the table.

9. In a machine tool having:
   (a) pair of spindles spaced apart a predetermined distance,
   (b) a table to support a workpiece,
   (c) means selectively to render one of said spindles effective at a time to operate on said workpiece,
   (d) a pair of control members positioned adjacent the table for operation in response to movement of the table, said control members spaced apart said predetermined distance and each effective when one of said spindles is rendered effective to control movement of the table, and
   (e) a fixed stroke motor operable to effect relative shifting between the table and the spindles said predetermined distance in response to a change of spindle.

10. In a machine tool having a pair of spindles spaced apart a predetermined distance:
    (a) a table to support a workpiece,
    (b) two sets of control members positioned adjacent the table for operation in response to movement of the table, said sets of control members spaced apart said predetermined distance,
    (c) a fixed stroke motor operable to effect relative shifting between the table and the spindles said predetermined distance, and
    (d) a selector valve operable to run one or the other spindle for operation on the workpiece, to render one or the other of said sets of control members effective to control movement of the table, and to operate the fixed stroke motor on a change of spindles.

11. In a machine tool having a pair of spindles spaced apart a predetermined distance:
    (a) a drive member,
    (b) a drive motor to effect controlled movement of said drive member,
    (c) a table mounted for movement past the spindles,
    (d) a fixed stroke motor connected between the table and the drive member to transmit motion of the drive member to the table and to shift the table said predetermined distance relative to the drive member, and (e) a readout unit connected to the drive member to indicate the movement of the drive member transmitted to the table.

12. In a machine tool having a pair of spindles each having a tool therein and spaced apart a predetermined distance:

(a) a drive member,
(b) a drive motor to move said drive member,
(c) a table to support a workpiece, said table mounted for movement past the spindles,
(d) means to control said drive motor including a pair of control members positioned adjacent the table for operation in response to movement of the table, said control members spaced apart said predetermined distance and each effective when one of said spindles is rendered effective to control movement of the table,
(e) a fixed stroke motor connected between the drive member and the table operable when energized to shift the table relative to the drive member said predetermined distance, said fixed stroke motor transmitting movement from the drive member to the table,
(f) a readout unit connected to the drive member to indicate the movement of the drive member transmitted to the table,
(g) means to select one or the other spindle for operation by the tool therein on the workpiece,
(h) means to actuate the selected spindle, and
(i) means responsive to a change of spindles to energize said fixed stroke motor.

No references cited.

RICHARD H. EANES, JR., *Primary Examiner.*